United States Patent [19]

Klingerman

[11] Patent Number: 4,484,417
[45] Date of Patent: Nov. 27, 1984

[54] SAWING APPARATUS

[75] Inventor: Robert H. Klingerman, Knoxville, Tenn.

[73] Assignee: W. J. Savage Company, Knoxville, Tenn.

[21] Appl. No.: 443,277

[22] Filed: Nov. 22, 1982

[51] Int. Cl.³ .......................... B24B 55/02; B28D 7/02
[52] U.S. Cl. ........................................ 51/267; 51/322; 125/13 R; 30/123.3; 83/169
[58] Field of Search ...................... 51/266, 267, 281 R, 51/322; 125/13 R, 13 SS, 14; 409/136; 83/169, 171; 29/DIG. 87, DIG. 88, DIG. 91; 30/123.3

[56] References Cited

U.S. PATENT DOCUMENTS

| 2,475,811 | 7/1949 | Wagner et al. | 51/267 |
| 2,991,599 | 7/1961 | Else | 51/267 |
| 3,127,886 | 4/1964 | Miller | 51/267 |
| 3,310,915 | 3/1967 | Wehmer | 51/267 |

FOREIGN PATENT DOCUMENTS

| 593566 | 5/1959 | Italy | 125/13 R |
| 686885 | 9/1979 | U.S.S.R. | 51/267 |

Primary Examiner—Roscoe V. Parker
Attorney, Agent, or Firm—Seidel, Gonda & Goldhammer

[57] ABSTRACT

A housing supports a rotatable saw blade with a portion of the blade projecting below the housing for contacting material to be cut. Two sets of nozzles are provided on the housing for directing a coolant liquid to opposite sides of the blade. Each set of nozzles includes an upper row for interrupting laminar air flow on the blade surface and channeling such air flow into the discharge from a lower set of nozzles.

11 Claims, 3 Drawing Figures

SAWING APPARATUS

BACKGROUND OF THE INVENTION

In many industrial sawing applications, results may be improved by applying coolant to the blade during the sawing process. Past attempts to apply coolant to a rapidly spinning blade have only been partially successful. In practice, large amounts of water are used in the hope that some small amount will finally reside in the desired area such as the point of contact between the blade and the material to be cut. Heat is the enemy of any sawing process since excessive heat causes rapid blade wear, poor surface quality, and burning of the material to be cut. Coolant which is applied directly to the source of heat generation vaporizes into steam and removes heat at the generation point thus alleviating these problems.

Present technology injects coolant into a guard for the blade on both sides of the blade in an effort to force intimate contact with the blade and the water in a restricted area. This results in an explosion of coolant where the blade leaves the guard and also results in poor wetting of the blade. Present practice in some variations allows one side of the blade to become wetter than the other whereby the blade cuts at an angle which in turn leads to excessive blade wear and poor cuts. Coolant is applied in excessive amounts and ejects from both sides of the saw blade along the material to be cut with a resultant housekeeping problem as well as the expense of the lost coolant.

The present invention is directed to solution of the above-described problems and is based on a recognition that laminar air flow on the surface of the blade must be interrupted and turbulence created in an area wherein additional coolant will fully wet the blade surface and maximize the coolant carried into the arc of contact between the blade and the material to be cut.

SUMMARY OF THE INVENTION

The present invention is directed to sawing apparatus wherein a housing supports a rotatable saw blade. A portion of the blade projects below the housing for contacting material to be cut. Two sets of nozzles are provided on the housing for directing a coolant liquid to opposite sides of the blade. Each set of nozzles includes an upper row of nozzles for directing a sharply defined high impact spray pattern and a lower row of nozzles for directing a low impact flat spray pattern. The nozzles of the lower row are staggered with respect to the nozzles of the associated upper row. The nozzles of the upper rows are spaced apart so that their patterns do not overlap one another whereby laminar air flow on the blade surface is interrupted and turbulence is created in the spaces between the patterns of the nozzles of the upper rows for subsequent contact with the spray patterns of the nozzles of the lower rows.

Various objects and advantages of the present invention are set forth hereinafter.

For the purpose of illustrating the invention, there is shown in the drawings a form which is presently preferred; it being understood, however, that this invention is not limited to the precise arrangements and instrumentalities shown.

DETAILED DESCRIPTION

Figure 1:
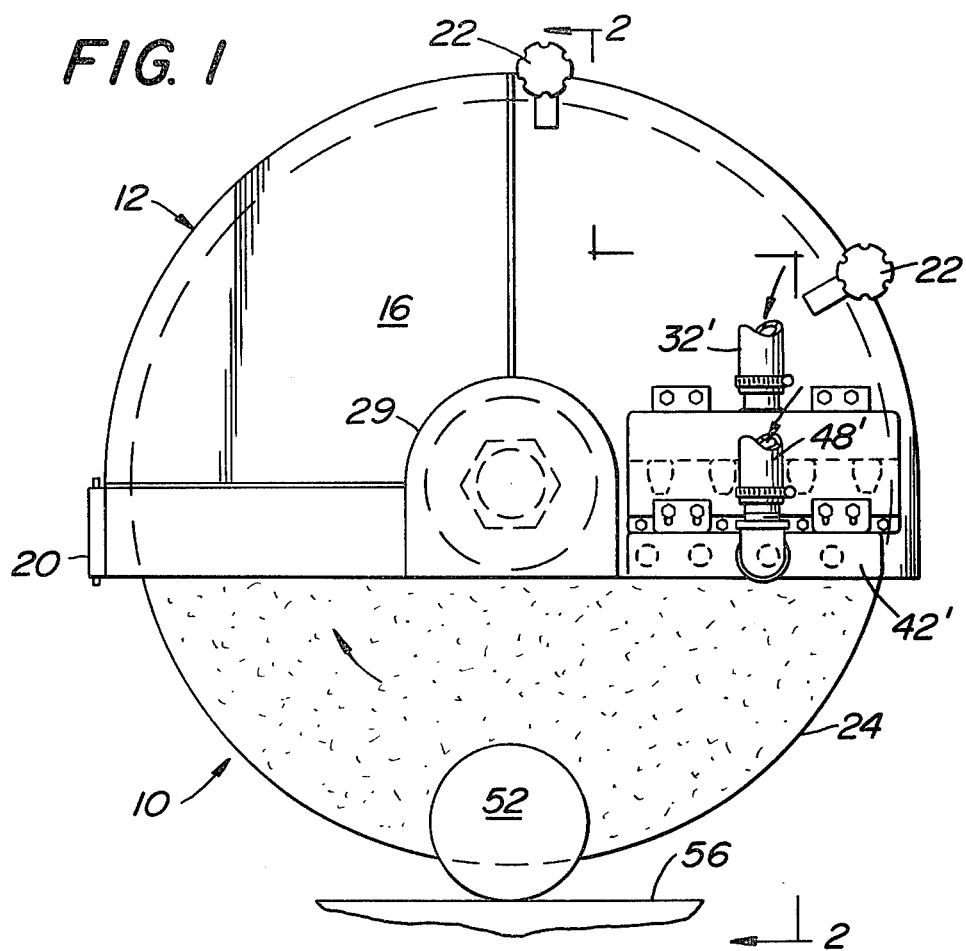
FIG. 1 is a side elevation view of sawing apparatus in accordance with the present invention.

Referring to the drawing in detail, wherein like numerals indicate like elements, there is shown in FIG. 1 apparatus in accordance with the present invention designated generally as 10. The apparatus 10 includes a guard housing designated generally as 12 which may be supported in any convenient manner. The guard housing 12 is preferably comprised on two halves which include side wall 16 and 18 coupled together at hinge 20 so that they may be moved apart and expose the abrasive saw blade 24. The two halves of the guard housing 12 are held in assembled relationship by one or more clamps 22. Blade 24 is coupled to shaft 14 which extends through an opening in the side wall 18. Blade 24 is held against plate 26 by nut 28. Side wall 16 has a cavity 29 to receive the nut 28 and a short extension of the stub shaft on which the blade 24 is mounted.

A means is provided for directing equal amounts of a coolant liquid to opposite side faces of a restricted area on the blade 24. The structure for accomplishing that result is identical on opposite sides of the blade 24. Hence, only the structure on one side of the blade will be described in detail with corresponding prime numerals being provided for the corresponding structure on the opposite side of the blade.

Figure 3:
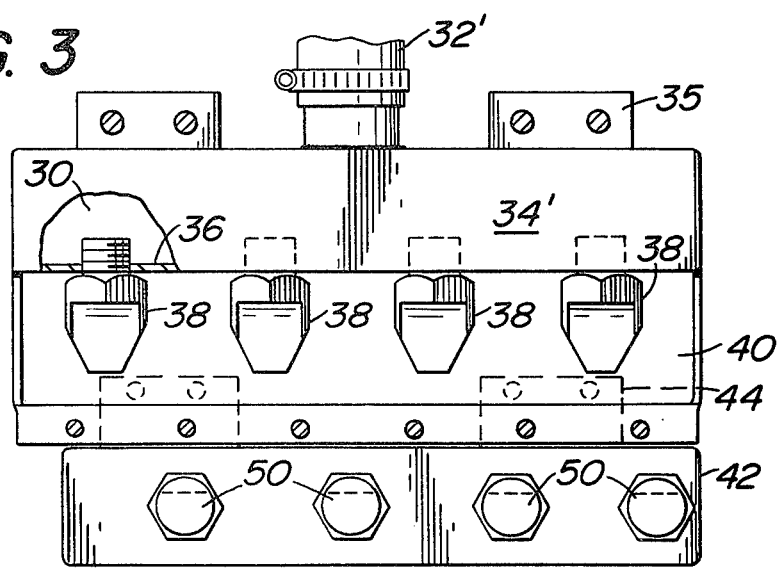
FIG. 3 is a sectional view taken along the line 3—3 in FIG. 2.
Figure 2:
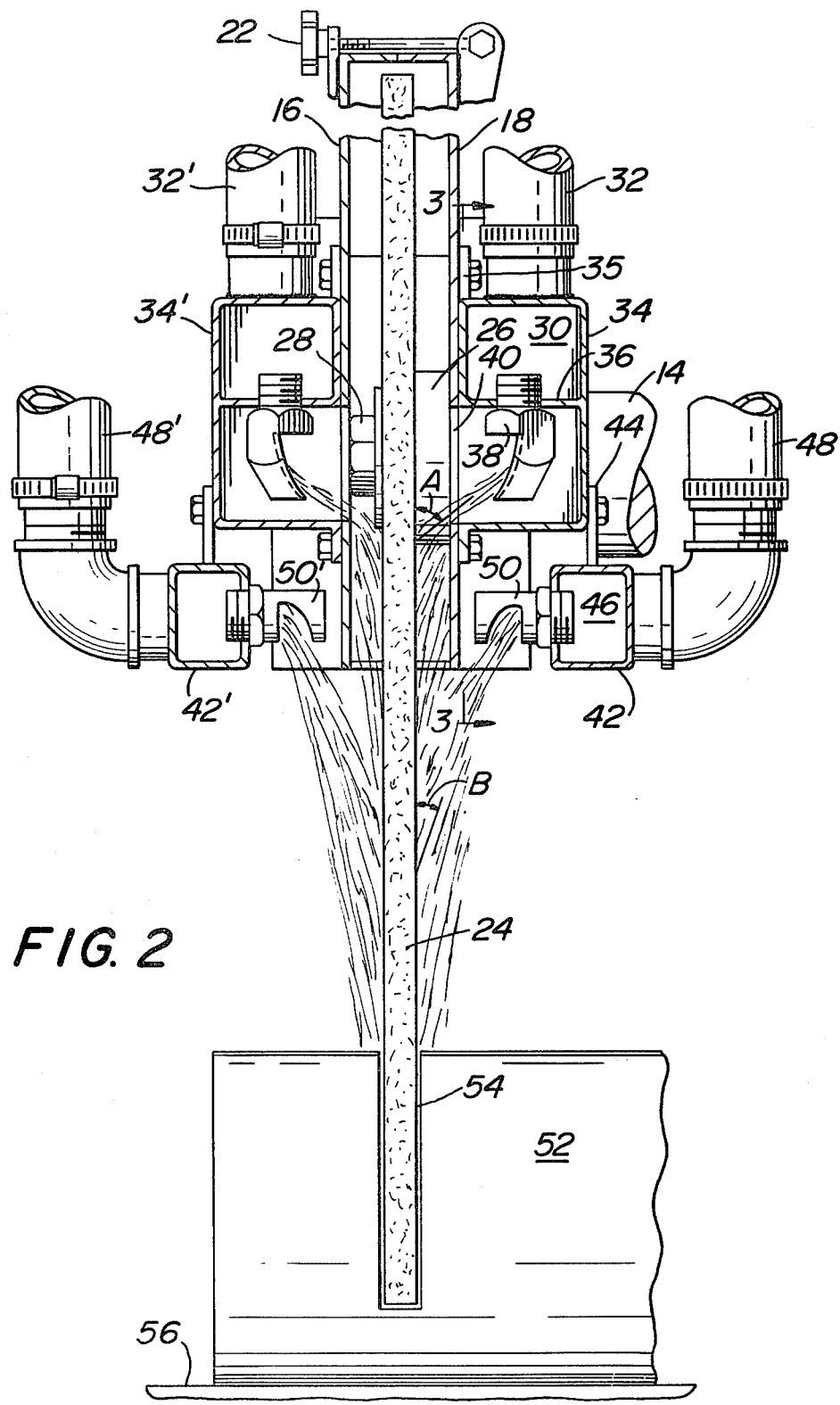
FIG. 2 is a sectional view taken along the line 2—2 in FIG. 1 but on an enlarged scale.

On the wall 18 there is bolted a flange 35 of support housing 34. A hose 32 is connected to housing 34 for introducing a coolant into a manifold chamber 30. Housing 34 has a horizontally disposed partition 36. The partition 36 supports a plurality of spaced nozzles 38. See FIG. 3. Nozzles 38 are of a particular type so as to provide a sharply defined high impact spray pattern with a narrow spray angle. Hoses 32, 32' are connected to a source of coolant liquid at high pressure such as 50 PSIG to 250 PSIG. Hoses 32, 32' are preferably connected to a pump so as to supply coolant liquid in the amount of 125 gallons per minute at a pressure of 100 PSIG. These parameters are typical for a 900mm diameter blade.

The nozzles 38 are spaced apart so that their spray patterns do not overlap. The distance between adjacent spray patterns can be from 6 mm to 100 mm with a typical spacing preferably being about 38 to 40 mm. The side wall 18 has an opening 40 through which the spray pattern of nozzles 38 may be directed in a downwardly angled direction as indicated by angle "A" and in the direction of blade rotation for contact with a limited area on the surface of the blade 24. Angle "A" is preferably 50° and the nozzle spray angle is preferably 50°.

An auxiliary housing 42 has brackets 44 removably bolted to a portion of the support housing 34. Housing 42 has a manifold chamber 46 therein which communicates by way of an elbow with coolant supply hose 48. Hose 48 communicates with a central portion of chamber 46 in the same manner that hose 32 communicates with a central portion of the chamber 30. Housing 42 supports a plurality of nozzles 50 arranged in a row. The nozzles 50 are staggered with respect to the nozzles 38 as shown more clearly in FIG. 3. Nozzles 50 are preferably of the type which have overlapping low impact flat spray patterns for flooding the juxtaposed surface of the blade 24. Hoses 48, 48' are preferably connected to a pump so as to supply coolant liquid in the amount of 100 gallons per minute at a low pressure such as 15 PSIG. These parameters are typical for a 900mm diameter blade. The downward angled spray of nozzles 50 is preferably as indicated by angle "B" which is 15°.

The material to be cut or work piece is designated 52 and positioned on any suitable support 56. Blade 24 produces a saw cut 54 in the work piece 52.

The apparatus 10 with a properly applied abrasive blade 24 has shown improved results when used to saw difficult to cut materials such as titanium, M-2 tool steel (tough heat sensitive material with 6.5% tungsten, 5% molybdenum, and 2% vanadium), nickel base alloys as well as plain carbon steel. Such improved results are surprising and unexpected.

The spray pattern of the nozzles 38 interrupts the laminar air flow pattern on the surfaces of the blade 24 and creates turbulence which is channeled into the areas between the adjacent spray patterns directly above the nozzles 50. The nozzles 50 supply an additional amount of liquid coolant at low pressure onto the surfaces to completely wet the surfaces of the blade 24. Since the nozzle arrangements and the supply hoses on opposite sides of the blade 24 are symmetrical, the amount of coolant liquid applied to each side of the blade 24 will be uniform. The number of nozzles in each row and the amount of coolant provided may vary with the size of the saw blade.

Abrasive blades have not been used for plain carbon steel in the past, due to their high cost as a consumable in the sawing process and due to the poor quality of the cuts (tolerance or straightness, burning and rough appearance). Currently steel is cut by tool steel and carbide tipped blades applied in power hack saws, band saws, and circular saws. These processes are quite cost effective, but they are very slow relative to abrasives. A cut which takes 1 to 2 minutes for an abrasive wheel may take 20 to 40 minutes for a band saw or power hack saw.

The present invention has produced some other surprising results. In addition to being able to precisely cut extremely hard work pieces, cutting rates as compared with previous standards have been doubled and at the same time the expected life of the blade has been more than doubled. The saw cuts 54 showed no signs of burning or angulation and the coolant liquid flowed through the saw cut 54 with a well-defined pattern of flow. Since the discharge from nozzles 50 is at a substantially lower pressure than that of nozzles 38, pumping costs in connection with nozzles 50 are reduced.

The present invention may be embodied in other specific forms without departing from the spirit or essential attributes thereof and, accordingly, reference should be made to the appended claims, rather than to the foregoing specification, as indicating the scope of the invention.

I claim:

1. Sawing apparatus comprising a housing supporting a rotatable saw blade, a portion of the blade projecting below the housing for contacting material to be cut, means including two sets of nozzles on each side of the housing for simultaneously directing a coolant liquid to opposite sides of a portion of the blade, each set of nozzles including an upper row of nozzles for directing a sharply defined high impact spray pattern and a lower row of nozzles for directing a low impact flat spray pattern, the nozzles of the lower row being staggered with respect to the nozzles of the associated upper row, the nozzles of the upper row being spaced apart so that their spray patterns do not overlap whereby laminar air flow on the blade surface is interrupted and turbulence is created in the spaces between the patterns of the nozzles of the upper row for subsequent contact with spray patterns of nozzles of the lower rows.

2. Apparatus in accordance with claim 1 wherein the nozzles of the lower rows have overlaping spray patterns at a substantially lower pressure than the spray patterns of the nozzles of the upper rows.

3. Apparatus in accordance with claim 2 wherein each of the nozzles has a discharge pattern which is angled downwardly and inwardly in the direction of the rotation of the saw blade, the angle for the lower nozzles being greater than the angle for the upper nozzles.

4. Apparatus in accordance with claim 3 including a separate discrete manifold for each row of nozzles, and a discrete conduit for supplying coolant liquid to each manifold adjacent a central portion thereof.

5. Apparatus in accordance with claim 1 wherein each set of nozzles includes a support housing attached to said first mentioned housing, each support housing having a partition defining one wall of a manifold chamber, each row of upper nozzles being attached to said partition, said first mentioned housing having an opening for the spray pattern of said upper nozzles.

6. Apparatus in accordance with claim 5 including an auxiliary housing attached to each support housing, each auxiliary housing having a manifold chamber, said rows of lower nozzles being supported by said auxiliary housings.

7. Sawing apparatus comprising a guard housing having generally parallel walls between which a saw blade is rotatably supported, a portion of the blade projecting below the housing for contacting material to be cut, identical means on opposite sides of said guard housing for directing a coolant liquid to opposite sides of a portion of the blade, each of said means including an upper row of nozzles and a lower row of nozzles, each upper row of nozzles being arranged for directing a sharply defined high impact spray pattern on the juxtaposed surface of the blade, each of said lower row of nozzles being arranged for directing a low impact flat spray pattern at a lower pressure on the juxtaposed surface of the blade, each nozzle having a spray pattern directed downwardly and inwardly toward the blade in the direction of the rotation of the blade, the nozzles of the lower rows being staggered with respect to the nozzles of the associated upper rows, the nozzles of the upper rows being spaced apart for a sufficient distance so their spray patterns do not overlap, the nozzles of the lower rows being spaced apart so that their spray patterns overlap.

8. A method of wetting the opposite side faces of a saw blade comprising the steps of rotating a saw blade, directing high impact spray patterns on said faces of the blade from an upper set of nozzles spaced so that their patterns do not overlap, interrupting laminar air flow on said blade faces by said spray patterns so that the air flow pattern is turbulent and channeled through the areas between said patterns, directing low impact spray patterns at said channelled air flow patterns on said blade faces from a lower set of nozzles located below the elevation of said upper nozzles for wetting said blade faces.

9. A method in accordance with claim 8 including staggering the lower nozzles with respect to the nozzles thereabove and discharging liquid coolant from the lower nozzles at a pressure substantially below the pressure of the upper nozzles.

10. A method in accordance with claim 9 wherein the spray patterns of the lower nozzles are overlaping flat spray patterns.

11. Sawing apparatus in accordance with claim 7 wherein said identical means on opposite sides of said housing includes symmetrical conduits with an equal number of percision nozzles on each side of the saw blade so that equal water flow is applied to both sides of the blade.

* * * * *